(12) United States Patent
Watadani et al.

(10) Patent No.: US 7,586,714 B2
(45) Date of Patent: Sep. 8, 2009

(54) HEAD SUSPENSION WITH RAILS AND SUPPORT EXTENSIONS

(75) Inventors: Eiji Watadani, Yokohama (JP); Masao Hanya, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 437 days.

(21) Appl. No.: 11/378,917

(22) Filed: Mar. 17, 2006

(65) Prior Publication Data

US 2006/0209463 A1    Sep. 21, 2006

(30) Foreign Application Priority Data

Mar. 17, 2005   (JP) ............................ P2005-076531

(51) Int. Cl.
*G11B 5/55* (2006.01)
(52) U.S. Cl. .................................... 360/244.8
(58) Field of Classification Search .............. 360/245.2, 360/244.8, 244.9
See application file for complete search history.

(56) References Cited

U.S. PATENT DOCUMENTS 6,765,759 B2   7/2004   Bhattacharya et al.
6,870,708 B1*  3/2005   Fossum et al. ........... 360/244.5
2001/0043443 A1* 11/2001  Okamoto et al. ............ 360/294
2003/0002220 A1*  1/2003  Nojima ..................... 360/244.9

FOREIGN PATENT DOCUMENTS

| JP | 9-282624    | 10/1997 |
| JP | 2001-143422 | 5/2001  |
| JP | 2005-056455 | 3/2005  |

* cited by examiner

*Primary Examiner*—A. J. Heinz
(74) *Attorney, Agent, or Firm*—Jordan and Hamburg LLP (57) ABSTRACT

A head suspension includes an arm turned around a spindle, the load beam, and a flexure. The load beam includes a rigid part, a resilient part, and a head. The rigid part has a body and a joint. The joint is connected to a first end of the resilient part that is supported with the arm. The head is for writing and reading data to and from a disk and is positioned at a front end of the load beam to receive load from the load beam. The flexure is attached to the load beam and supports the head. A rail is formed along each side edge of the body of the rigid part and rises in a thickness direction of the body. The first end of the resilient part has extensions that extend over the joint of the rigid part toward the body of the rigid part. The extensions are fixed to the body of the rigid part.

7 Claims, 11 Drawing Sheets

DISTRIBUTION OF LB (LB : t25um, Hinge : t25um)

*Vertical Stiffness of Beam*

Fig.6

Hinge Thickness : t25um

| Beam thickness | 1st Bending Freq. | | ΔB1 | G lift off | |
|---|---|---|---|---|---|
| [um] | 1 Laser Weld [ kHz ] | 2 Laser Welds [ kHz ] | [ Hz ] | 1 Laser Weld [G/gf] | 2 Laser Welds [G/gf] |
| 35 | 5.98 | 6.54 | 558 | 357.2 | 355.8 |
| 30 | 5.77 | 6.41 | 643 | 386.0 | 384.0 |
| 25 | 5.52 | 6.28 | 759 | 419.1 | 416.0 |
| 20 | 5.18 | 5.97 | 794 | 462.3 | 457.8 |

| PRESENCE OR ABSENCE OF LIFT OFF | Static G lift off 506.1G/3gf | | Static G lift off 506.1G/3gf | |
|---|---|---|---|---|
| | Loadbeam B1:3.11kHz (Short Rail Loadbeam) | | Loadbeam B1:4.02kHz (Long Rail Loadbeam) | |
| | 0.4msec | 1msec | 0.4msec | 1msec |
| No lift off | 273G | 257G | 273G | 273G |
| | | 292G | 301G | 302G |
| Lift off at Leading side | (296G) | | (325G) | 327G |
| Lift off | 324G | 327G | 351G | 354G |

Suspension B1:3.1kHz

HEAD SUSPENSION WITH RAILS AND SUPPORT EXTENSIONS

BACKGROUND OF THE INVENTION

1. Field of the Invention

The present invention relates to a head suspension of a hard disk drive incorporated in an information processor such as a personal computer.

2. Description of Related Art

A head suspension of a hard disk drive includes a load beam, a head supported with the load beam, and a slider attached to the head. The head suspension has a shock property that determines a lift of the slider from the surface of a hard disk when a shock is applied. The shock property of the head suspension is dependent on the weight of the load beam.

For example, a first head suspension has a load beam having a thickness (t) of 51 μm, a length (1L) of 7 mm, and a gram load of 2.5 gf that is applied by the load beam to a head, and a second head suspension has a load beam having a thickness (t) of 30 μm, a length (1L) of 5.5 mm, and a gram load of 2.5 gf. If a shock of 1 msec duration (1 msec in half wavelength) is applied to these head suspensions, a slider of the first head suspension lifts at an acceleration of 628 G and a slider of the second head suspension lifts at an acceleration of 1103 G.

To improve the shock property of a head suspension, a load beam of the head suspension must be thin and short and has a large gram load.

Figure 14:
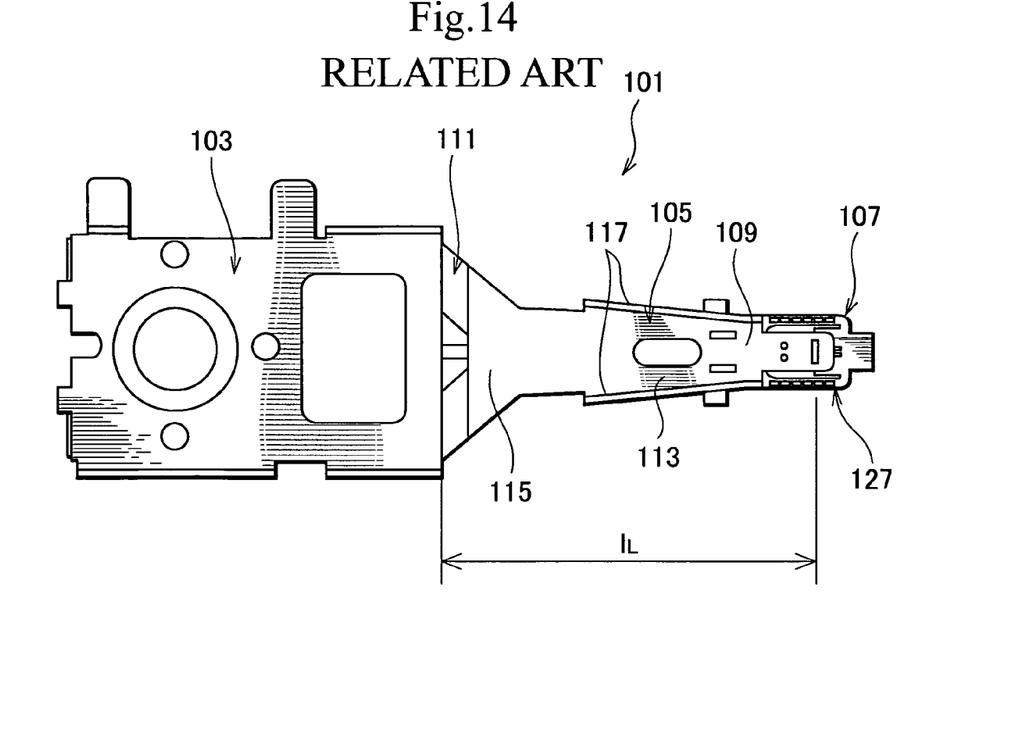
FIG. 14 is a plan view showing a head suspension according to a related art.

FIG. 14 is a plan view showing a head suspension 101 for a hard disk drive according to a related art. The head suspension 101 has a base plate 103, a load beam 105, and a flexure 107. The load beam 105 has a rigid part 109 and a resilient part 111. The rigid part 109 has a body 113 and a joint 115 that is attached to an end of the resilient part 111. Each side edge of the body 113 of the rigid part 109 is provided with a rail 117 that rises from the surface of the body 113.

Figure 15:
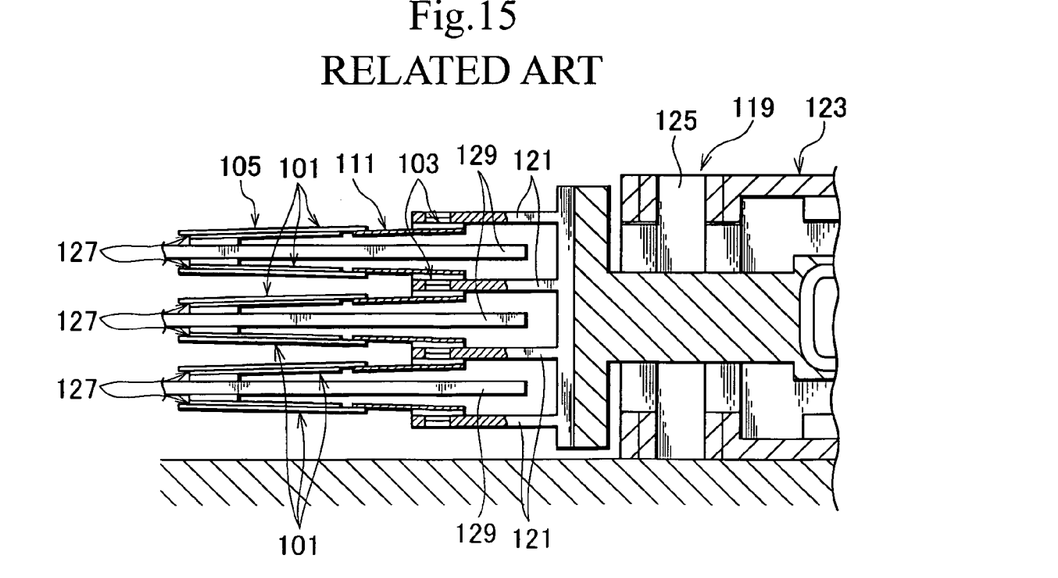
FIG. 15 is a partly sectioned view showing a hard disk drive in which the head suspension of the related art of FIG. 14 is installed.

FIG. 15 is a sectional view partly showing a hard disk drive in which the head suspension of FIG. 14 is installed. A carriage 119 has arms 121. To one of the arms 121, the base plate 103 of the head suspension 101 is fixed by, for example, swaging.

The carriage 119 is turned around a spindle 125 by a positioning motor 123 such as a voice-coil motor. The carriage 119 is turned around the spindle 125, to move a head 127 of the head suspension 101 to a target track on a hard disk 129.

When the disks 129 are rotated at high speed, the head 127 slightly rises from the surface of the disk 129 against the gram load of the head suspension 101.

To improve the shock property of the head suspension 101, the length (1L) of the load beam 105 is shortened and thinned, thereby reducing the weight of the load beam 105.

In practice, the arm 121 vibrates. Accordingly, the load beam 105 must be designed in consideration of the first bending frequency of the arm 121, i.e., the resonant frequency of the arm 121 in a first bending mode. The first bending frequency is hereinafter referred to as the "B1 frequency." It is important to consider the B1 frequency of the arm 121 when determining a B1 frequency for the load beam 105.

Figure 16:
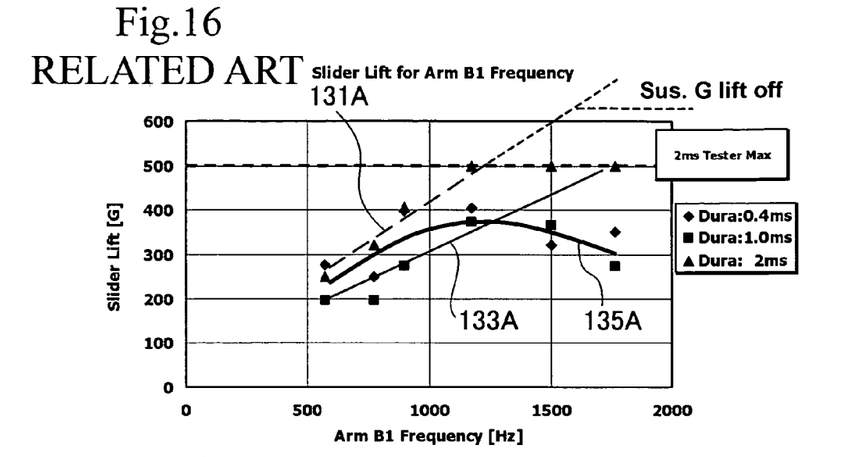
FIGS. 16 to 18 are graphs showing relationships between the B1 frequencies of an arm and the actions of the arm in a 2.5-inch disk drive according to a related art.
Figure 17:
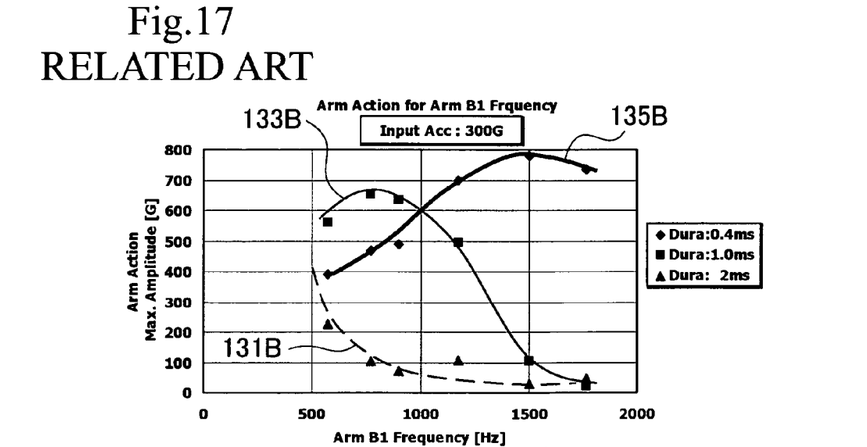
Figure 18:
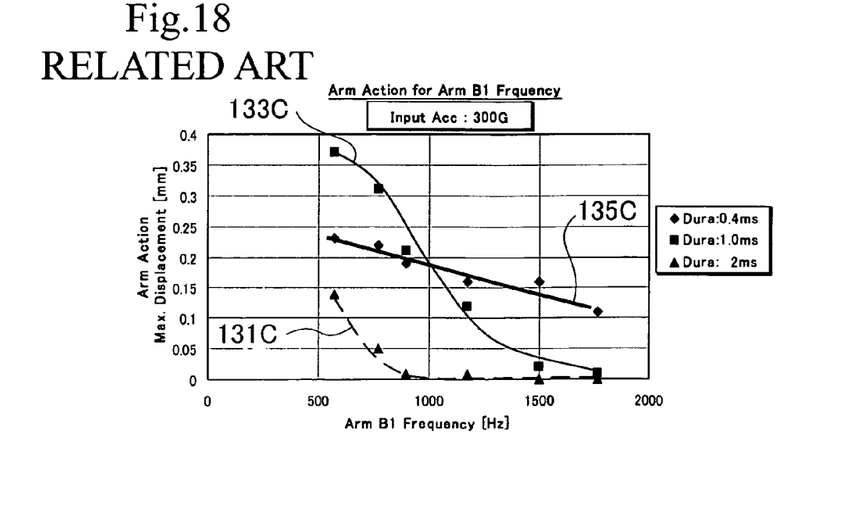

FIGS. 16 to 18 are graphs showing a relationship between the B1 frequency and shock property of an arm installed in a 2.5-inch hard disk drive. Among the figures, FIG. 16 shows an acceleration representative of a shock applied to the hard disk drive at which a slider of the arm lifts, FIG. 17 shows a maximum acceleration occurring at the front end of the arm due to the applied shock, and FIG. 18 shows a maximum displacement of the arm due to the applied shock. In each of FIGS. 16 to 18, an abscissa indicates the B1 frequency of the arm. In each of FIGS. 16 and 17, an ordinate indicates an acceleration on the arm. In FIG. 18, an ordinate indicates a displacement of the arm. The magnitude of acceleration of the applied shock is 300 G in each case. The half-wavelength duration of the applied shock is 2 msec, 1 msec, or 0.4 msec.

It is understood in FIGS. 16 to 18 that the arm is substantially immovable against a shock of 2 msec or 1 msec duration if the B1 frequency of the arm is high (for example, 1.5 kHz) as indicated with curves 131A, 131B, 131C, 133A, 133B, and 133C. On the other hand, the arm differently acts against a shock of 0.4 msec duration, as indicated with curves 135A, 135B, and 135C.

This is because the arm conducts a large action with respect to a shock of 0.4 msec duration even if the B1 frequency of the arm is high.

A head suspension attached to such an arm must follow the arm action. If the load beam of a head suspension can follow the vibration of an arm, the slider of the head suspension will not lift from the surface of a disk.

Another consideration must be done for the off-track property of a head suspension. It is basically understood that the vertical rigidity (or stiffness) of a head suspension never acts in an off-track direction.

In practice, head suspensions involve a slight twist, and disks involve a slight inclination. Due to such twist and inclination, the vertical rigidity or B1 frequency of a head suspension influences the off-track property of the head suspension.

Figure 19:
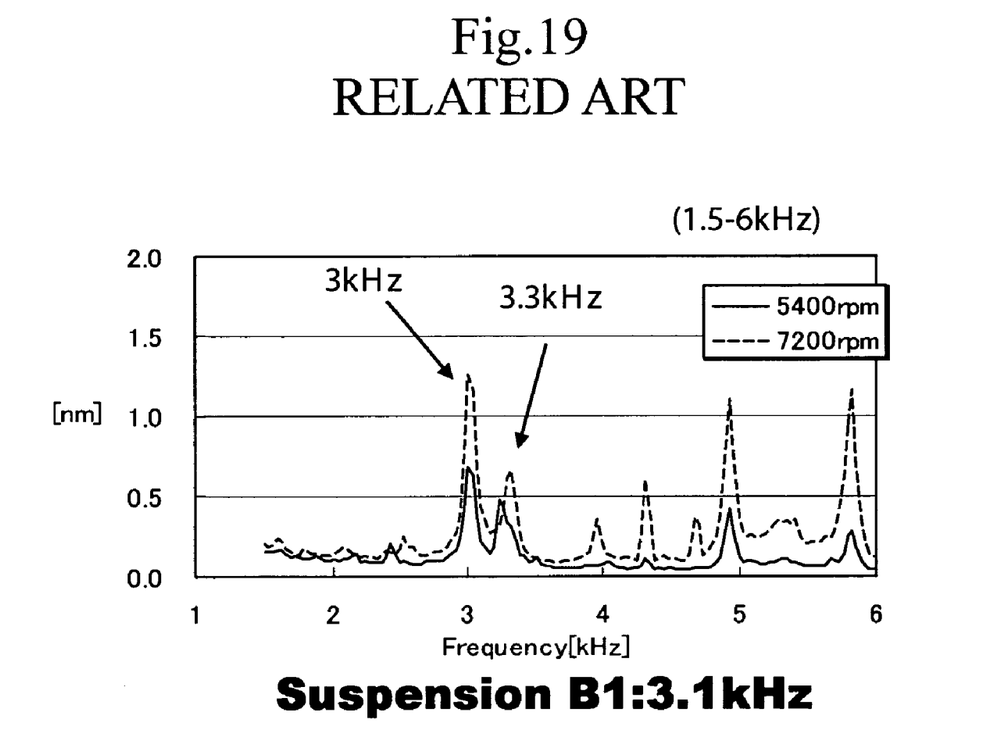
FIG. 19 is a graph showing the off-track property of a head suspension having a total B1 frequency of 3.1 kHz according to a related art.

FIG. 19 is a graph showing the off-track property of a head suspension whose B1 frequency is 3.1 kHz. In FIG. 19, an abscissa indicates the frequency of an arm and an ordinate indicates off-track displacement. In the graph of FIG. 19, a curve depicted with a continuous line represents the off-track property of a head suspension measured on a 2.5-inch disk rotated at 5400 rpm and a curve depicted with a dotted line represents the off-track property of the head suspension measured on a 2.5-inch disk rotated at 7200 rpm.

In FIG. 19, the head suspension has a low B1 frequency of 3.1 kHz, and therefore, the bending mode of the head suspension overlaps the bending mode of the arm. As a result, an off-track phenomenon is observed at 3.0 kHz and at 3.3 kHz.

To avoid the off-track phenomenon, the B1 frequency of the load beam of the head suspension must be increased so that the bending mode of the head suspension will not overlap the bending mode of the arm.

To improve the B1 frequency of a load beam, forming the rail 117 along each side edge of the body 113 of the rigid part 109 as shown in FIG. 14 is effective.

When the head suspension is used for a 3.5-inch disk drive, forming the rail 117 entirely along each side edge of the body 113 of the rigid part 109 is not so demanded, because the 3.5-inch disk drive has a more intense need for a high sway frequency.

When the head suspension is used for a 2.5-inch disk drive, an improved shock property is acutely required. If no rail is formed along each side edge of the body 113 of the rigid part 109, the B1 frequency of the load beam is too low to satisfy the requirement.

Figure 20:
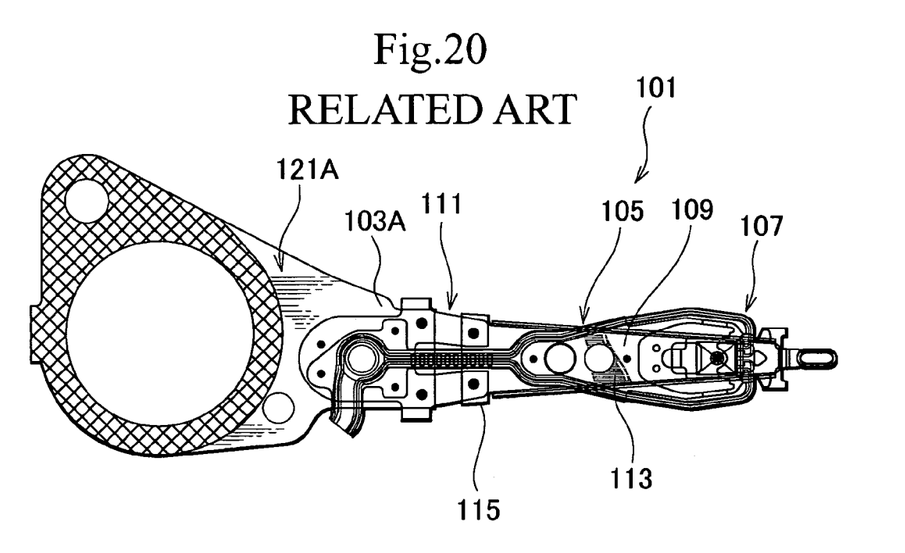
FIG. 20 is a plan view showing a first face of a head suspension according to a related art.
Figure 21:
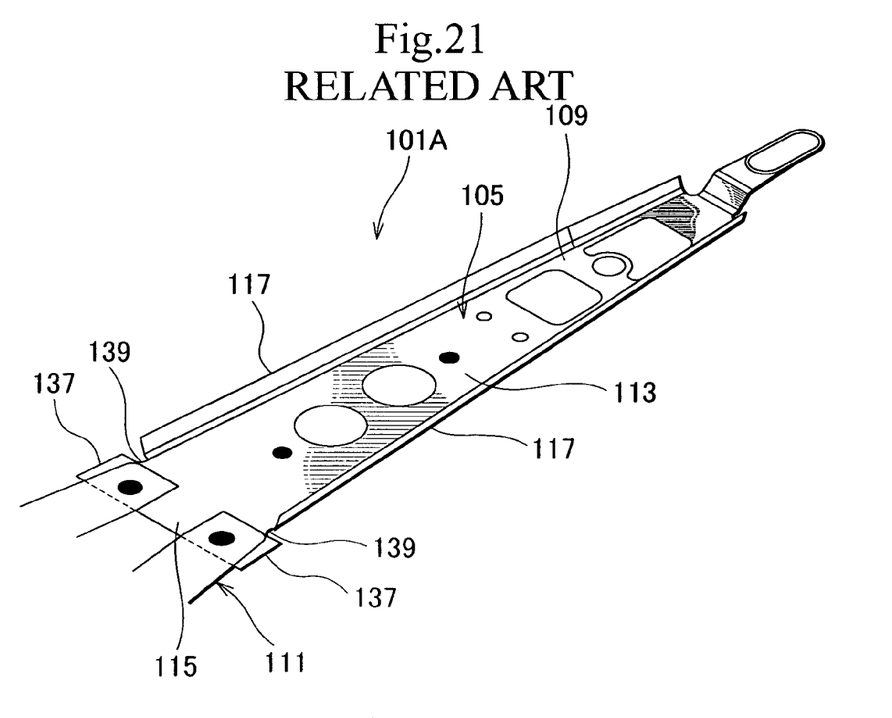
FIG. 21 is an enlarged perspective view showing the head suspension of the related art of FIG. 20.

FIGS. 20 and 21 show the structure of a head suspension according to a related art that can increase the B1 frequency of a load beam 105 to some extent. FIG. 20 is a plan view showing a first face of the head suspension and FIG. 21 is a perspective view partly showing the head suspension. In FIGS. 20 and 21, parts corresponding to those of FIG. 14 are represented with like reference numerals. The head suspension 101A of FIGS. 20 and 21 includes an arm 121A and a base 103A that are integral with each other.

The head suspension 101A has a rail 117 formed along each side edge of a body 113 of a rigid part 109, to improve the B1 frequency of the load beam 105.

The rigid part 109 has a joint 115 that is attached to a resilient part 111. The joint 115 has edges 137. When a plurality of rigid parts are cut from a plate material into individual rigid parts 109, the edges 137 of each rigid part 109 serve as parts that are cut from the adjacent edges 137. Due to this, it is impossible to extend the rail 117 along each edge 137 of the joint 115. This results in leaving a blank 139 between the rail 117 and the joint 115. The blank 139 which has no rails prevents the load beam 105 from increasing the B1 frequency thereof.

For the details of the above-mentioned related arts, U.S. Patent Publication No. 6,765,759 B2 and Japanese Unexamined Patent Application Publication No. 09-282624 can be referred to.

SUMMARY OF THE INVENTION

An object of the present invention is to provide a head suspension having a load beam and rails formed on the load beam, capable of solving the problem of a blank left between each rail and a joint of the load beam, to achieve a required shock property and increase the B1 frequency of the load beam.

In order to accomplish the object, an aspect of the present invention provides a head suspension having a load beam. The load beam includes a rigid part and a resilient part. The rigid part has a body and a joint that is attached to a first end of the resilient part. A rail is formed along each side edge of the body of the rigid part. The rail rises in a thickness direction of the body of the rigid part. The first end of the resilient part has an extension extending over the joint of the rigid part toward the body of the rigid part. The extension of the resilient part is fixed to the body of the rigid part.

According to this aspect of the present invention, the first end of the resilient part has the extension that extends over the joint of the rigid part toward the body of the rigid part and is fixed to the body of the rigid part. This configuration increases the vertical rigidity of the load beam, heightens the B1 frequency of the head suspension, and satisfies a shock property required for the head suspension.

DETAILED DESCRIPTION OF EMBODIMENTS

The present invention satisfies a required shock property by providing a resilient part of a load beam (LB) of a head suspension with extensions.

A head suspension for a hard disk drive according to an embodiment will be explained in detail.

Figure 1:
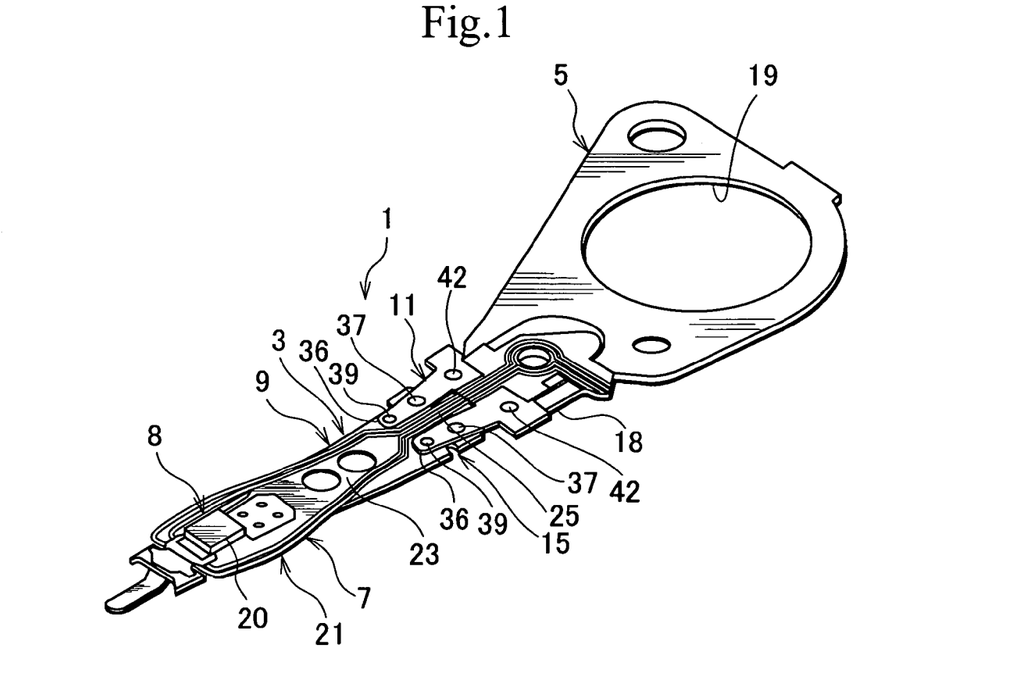
FIG. 1 is a perspective view showing a first face of a head suspension according to an embodiment of the present invention.
Figure 2:
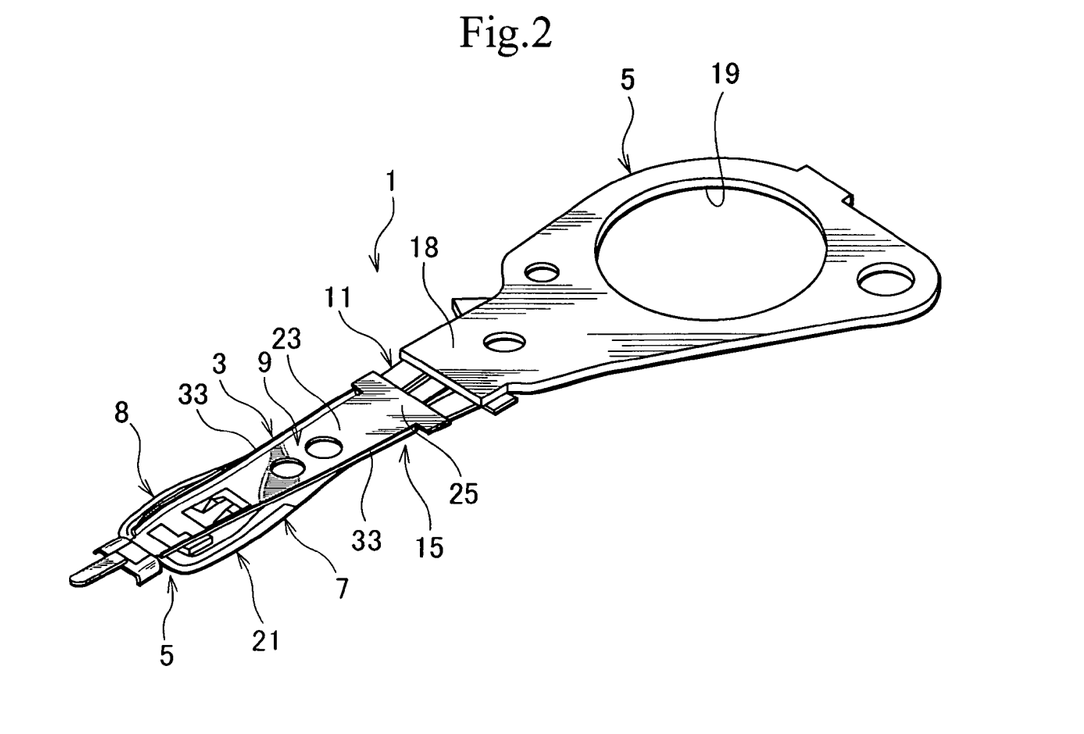
FIG. 2 is a perspective view showing a second face of the head suspension according to the embodiment.
Figure 3:
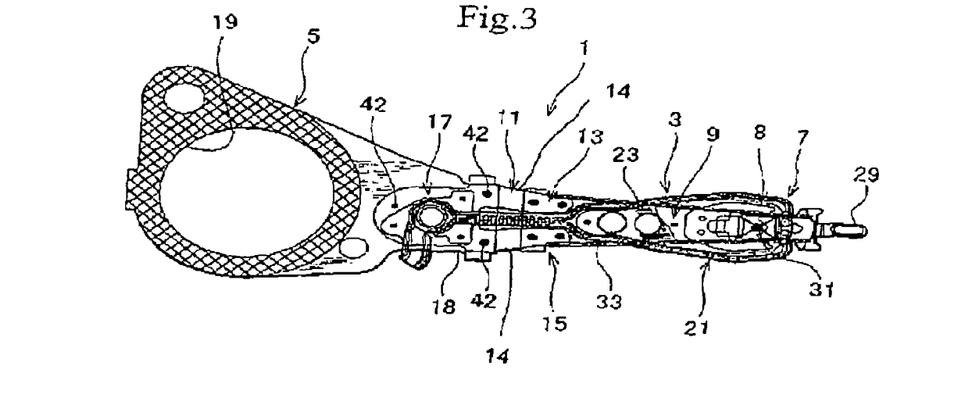
FIG. 3 is a plan view showing the first face of the head suspension according to the embodiment.

FIG. 1 is a perspective view showing a first face of the head suspension according to the embodiment, FIG. 2 is a perspective view showing a second face of the head suspension of the embodiment, and FIG. 3 is a plan showing the first face of the head suspension of the embodiment.

The head suspension 1 shown in FIGS. 1 to 3 is used for a 1-inch disk, for example, and has a load beam 3, an arm 5, and a flexure 7.

The load beam 3 applies load onto a head 8. The head 8 is arranged at a front end of the load beam 3, to write and read data to and from the disk. The load beam 3 includes a rigid part (or stiff part) 9 and a resilient part (or hinge) 11. The rigid part 9 is made of, for example, stainless steel and has a thickness of, for example, about 30 μm.

The resilient part 11 is prepared separately from the rigid part 9; i.e. the resilient part 11 is formed non-integrally with the rigid part 9 so that they are separate and distinct pieces. The resilient part 11 is made of, for example, a thin resilient rolled stainless-steel plate having a thickness of, for example, 25 μm. A first end 13 of the resilient part 11 is fixed to a base end 15 of the rigid part 9, and a second end 17 of the resilient part 11 is fixed to the arm 5.

The arm 5 has an integral base plate 18 serving as a base for supporting the resilient part 11. The arm 5 has a hole 19 to be fitted to a carriage of the hard disk drive, so that the head suspension 1 may turn around a spindle of the carriage. The base plate 18 may be independent of the arm 5 and may be fitted to the arm 5 by, for example, swaging.

The flexure 7 includes a conductive thin plate made of, for example, a resilient stainless-steel rolled plate (SST). On the thin plate, an insulating layer is formed. On the insulating layer, wiring patterns are formed. The flexure 7 is fixed to the rigid part 9 by, for example, laser welding. One ends of the wiring patterns are electrically connected to write and read terminals supported on a slider 20 of the head 8. The other ends of the wiring patterns are extended toward the arm 5.

Figure 4:
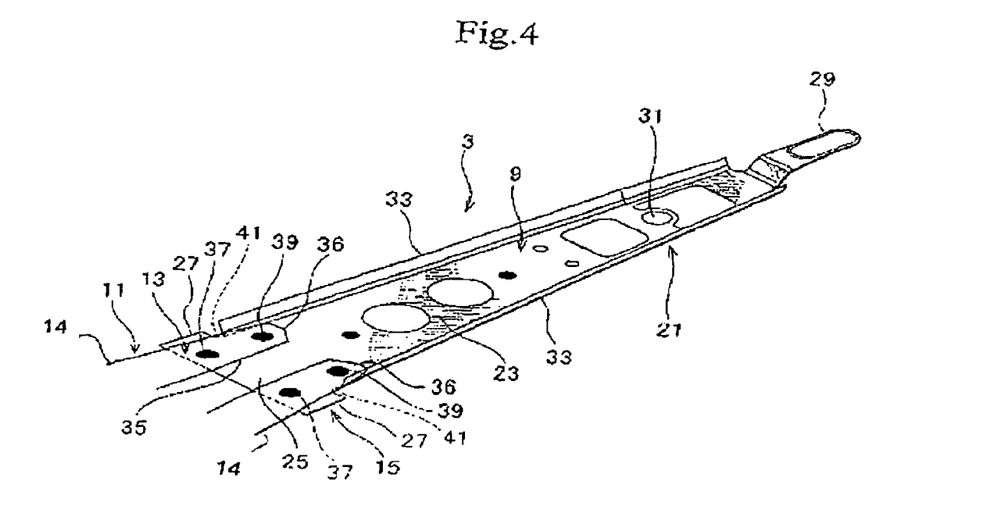
FIG. 4 is an enlarged perspective view showing a load beam of the head suspension according to the embodiment.

FIG. 4 is an enlarged perspective view showing the load beam 3.

In FIGS. 3 and 4, the rigid part 9 is generally narrow and extends from a front end 21 to the base end 15. The rigid part 9 includes a body 23 and a joint 25 located at the base end 15. The joint 25 is connected to the first end 13 of the resilient part 11. The joint 25 has side edges 27. A plurality of rigid parts 9 are cut from a plate material into individual rigid parts 9. At this time, the side edges 27 are cut from the adjacent side edges and are left as they are. The front end 21 of the rigid part 9 has a dimple 31 and a load/unload tab 29.

Each side edge of the body 23 of the rigid part 9 is provided with a rail 33, which rises in a thickness direction of the rigid part 9. Side edges 27, which have been cut from the adjacent side edges of body 23 and are not bent to form rails 33, form part of the joint 25 which is outside of the rail 33 positions.

The first end 13 of the resilient part 11 is divided into two branches 14 that are extended to form extensions 36. The extensions 36 extend over the joint 25 toward the body 23 of the rigid part 9. Each extension 36 extends along a corresponding one of the rails 33 that is formed along a side edge of the rigid part 9, to be adjacent to the corresponding one of the rails 33 in the across-width direction of the rigid part 9. Between the branches 14 at the first end 13 of the resilient part 11, there is a space 35 to steplessly guide the flexure 7 from the body 23 of the rigid part 9.

The middle of the branches 14 each being a part of the first end 13 of the resilient part 11 is fixed to the joint 25 of the rigid part 9 by, for example, laser welding at two spots 37 that are located close to the side edges 27 of the joint 25. The tip parts of the branches 14 each being the extension 36 as a part of the first end 13 of the resilient part 11 is also fixed to the body 23 of the rigid part 9 by, for example, laser welding, at two spots 39 that are located close to the side edges of the body 23. In this way, the resilient part 11 is welded to the joint 25 of the rigid part 9 at least at two spots and to the body 23 of the rigid part 9 at least at two spots. The number of weld spots between the resilient part 11 and the rigid part 9 may be increased.

Welding the first end 13 of the resilient part 11 to the joint 25 of the rigid part 9 and welding the extensions 36 of the resilient part 11 to the body 23 of the rigid part 9 reinforce blanks 41 left between the rails 33 and the joint 25 of the rigid part 9 without increasing the number of parts.

The second end 17 of the resilient part 11 is fixed to the base plate 18 by, for example, laser welding at spots 42.

Figure 5:
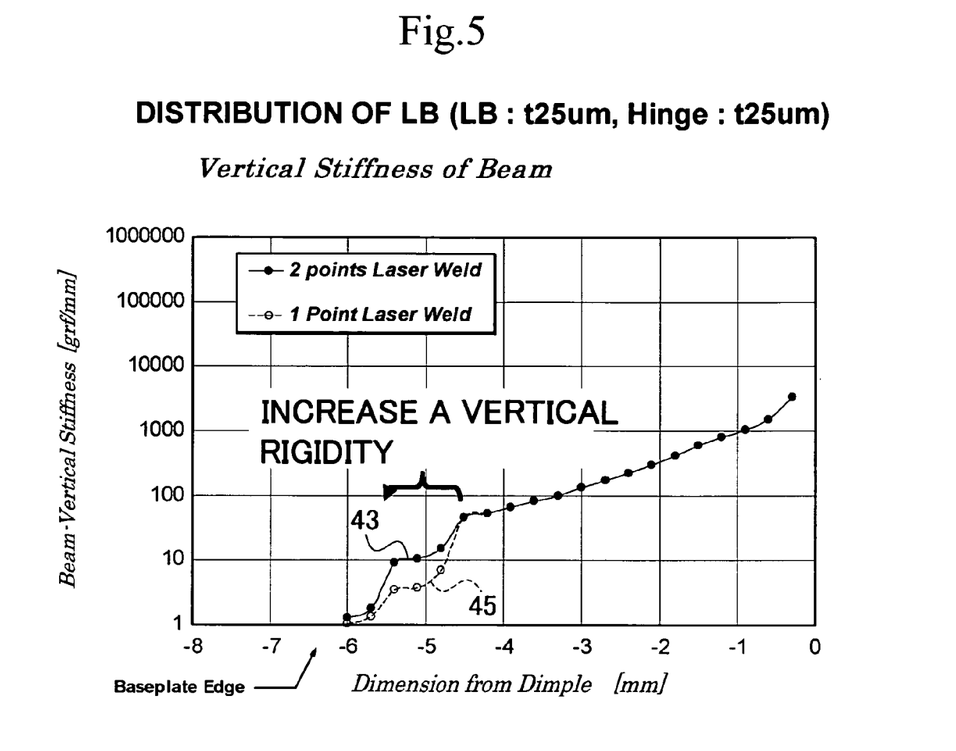
FIG. 5 is a graph showing a distribution of vertical rigidity (or stiffness) of the load beam according to the embodiment.

FIG. 5 is a graph showing a distribution of vertical stiffness (rigidity) of the load beam 3 according to the embodiment of the present invention. An abscissa indicates a distance from the dimple 31 and an ordinate indicates stiffness. The distance from the dimple 31 is zero at the dimple 31, is −6 at an end of the arm 5, and is approximately −5 at the blanks 41.

In FIG. 5, a 2-point-laser-weld curve 43 represents the embodiment, having the extensions 36, that welds the resilient part 11 to the rigid part 9 at two spots along each side edge, and a 1-point-laser-weld curve 45 represents the related art of FIG. 20, having no extensions, that welds the resilient part 111 to the rigid part 109 at a single spot along each side edge.

As is apparent in FIG. 5, the embodiment employing the extensions 36 for reinforcing the blanks 41 (FIG. 4) can secure the vertical rigidity of the load beam 3 despite the presence of the blanks 41.

Figure 6:
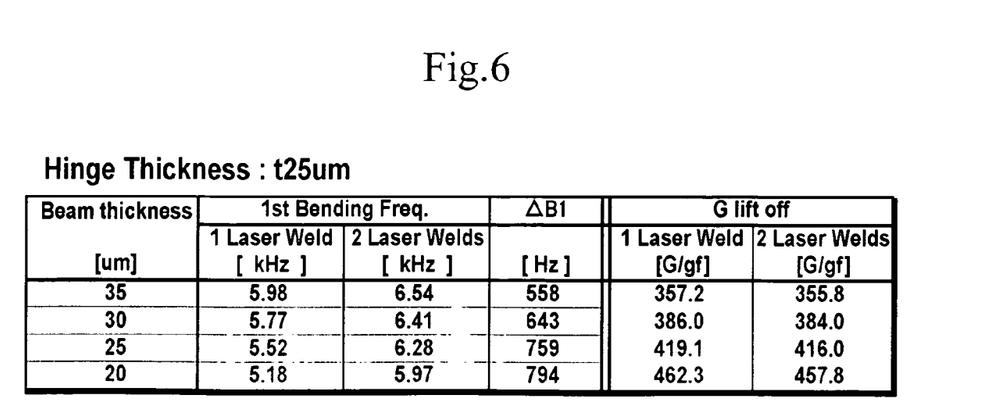
FIG. 6 is a list showing the B1 frequencies and static shock properties of load beams having four different thicknesses ranging from 20 μm to 35 μm.

FIG. 6 is a list showing the first bending frequencies as B1 frequencies and static shock properties of load beams having four different thicknesses ranging from 20 μm to 35 μm. The static shock property of a load beam is expressed with the magnitude of a shock at which a slider of the load beam is lifted from the surface of a disk that is stationary (not turned). The phenomenon that a slider of a load beam lifts off from the surface of a disk in a static state (the disk is not turned) in response to the application of a shock is referred to as "G-lift-off." The "G-lift-off" is also indicative of the magnitude of the shock that causes a lift-off of the slider. The thickness of the resilient part of each load beam in FIG. 6 is 25 μm.

In the column of B1 frequency, i.e., first bending frequency, values in a left column are of the related art employing the 1-point laser weld technique and values in a right column are of the embodiment employing the 2-point laser weld technique. Similarly, in the column of G-lift-off, values in a left column are of the related art and values in a right column are of the embodiment. Values in the column of ΔB1 represent differences between the B1 frequencies of the related art and those of the embodiment.

Figure 7:
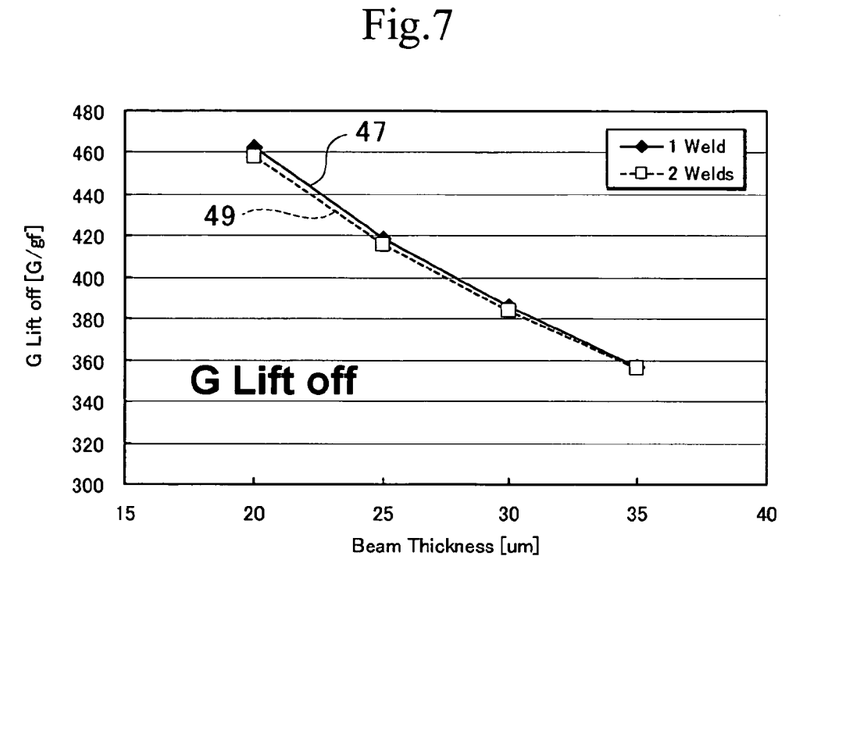
FIG. 7 is a graph showing the shock properties of the load beams of FIG. 6.
Figure 8:
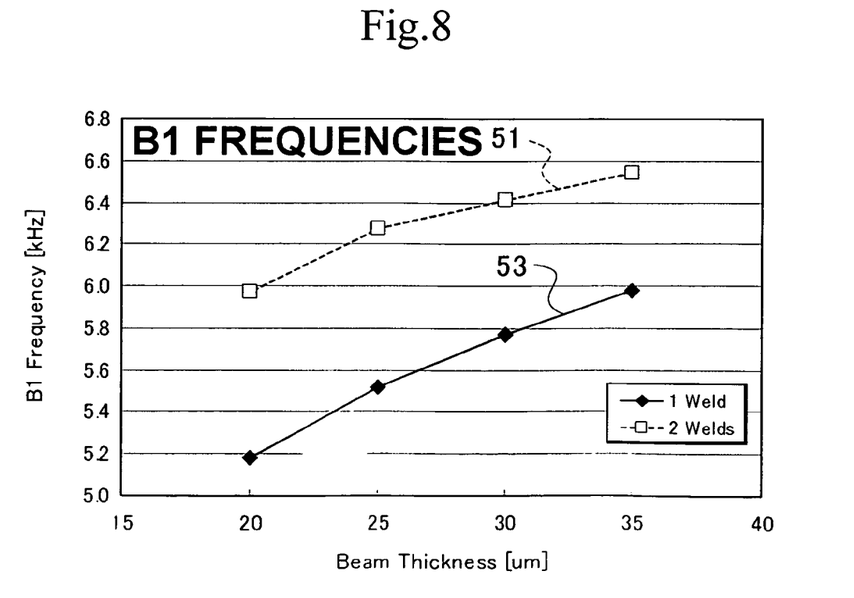
FIG. 8 is a graph showing the B1 frequencies of the load beams of FIG. 6.

FIGS. 7 and 8 are graphs plotted from the values shown in FIG. 6. The graph of FIG. 7 shows the static shock properties of the load beams. An abscissa indicates the thickness of a load beam and an ordinate indicates the G-lift-off of the load beam. The graph of FIG. 8 shows the B1 frequencies of the load beams. An abscissa indicates the thickness of a load beam and an ordinate indicates the B1 frequency of the load beam.

In FIG. 7, a curve 47 represents the load beams according to the related art of FIG. 20 employing the 1-point laser weld technique and a curve 49 represents the load beams according to the embodiment employing the 2-point laser weld technique. It is understood from FIG. 7 that the related art and embodiment increase the G-lift-off as the thickness of the load beam becomes thinner. The head suspensions of the embodiment show no deterioration in the shock properties thereof.

In FIG. 8, a curve 51 represents the load beams according to the embodiment and a curve 53 represents the load beams according to the related art. For each load beam thickness, the embodiment demonstrates a higher B1 frequency than the related art.

As is apparent in FIGS. 7 and 8, the embodiment employing the 2-point laser weld technique can increase the B1 frequency higher than the related art employing the 1-point laser weld technique, without deteriorating the static shock property. For a given B1 frequency, the embodiment can increase G-lift-off by 100 G/gf higher than the related art.

An analysis of characteristics or properties that are required for a load beam to follow the motion of an arm will be explained.

Figure 9:
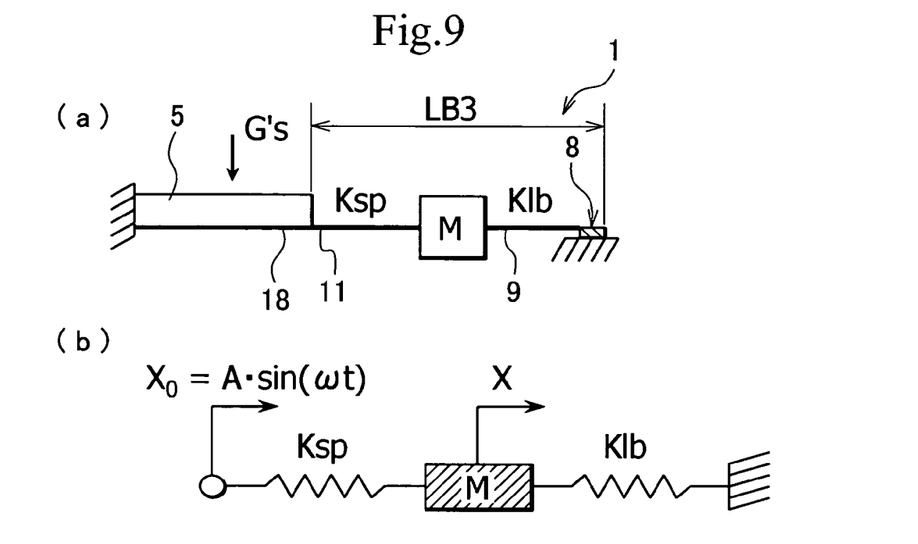
FIG. 9A is an analytic model showing a head suspension.
FIG. 9B is a vibration model based on the model of FIG. 9A.

FIG. 9A is an analytic model showing a head suspension and FIG. 9B is a vibration model based on the model of FIG. 9A. In FIGS. 9A and 9B, M is a mass of a load beam 3 assumed to be concentrated on the gravity center, Ksp is a spring constant between the gravity center of the load beam 3 and a resilient part 11, Klb is a spring constant due to the rigidity of a rigid part 9 from the gravity center to a dimple, G's is a shock input, X0 is an arm action, and X is a displacement of the load beam 3 at the gravity center.

The displacement X is expressed as follows:

$$X = A / \{(Klb/Ksp) - (\omega/\omega 0)^2 + \omega 0^2\} \quad (1)$$

$$\omega 0^2 = Ksp/M$$

Figure 10:
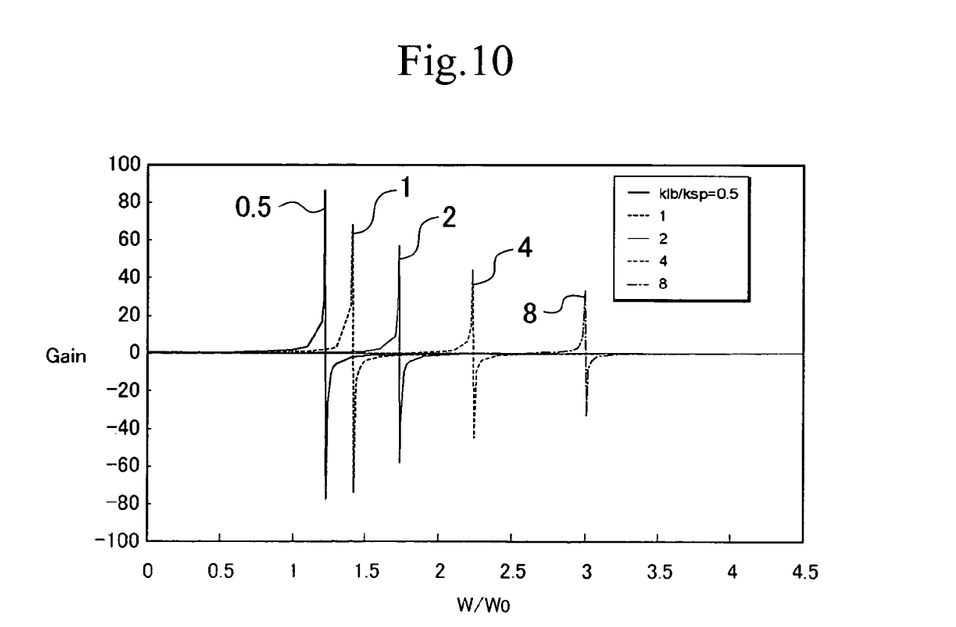
FIG. 10 is a graph showing a relationship between an increase in "Klb/Ksp" and a gain based on the models of FIGS. 9A and 9B.

Reducing the displacement X results in suppressing a lift of a slider from a disk. For this, the expression (1) indicates that $(Klb/Ksp)$ and $\omega 0^2$ must be increased. FIG. 10 is a graph showing a relationship between an increase in $(Klb/Ksp)$ and a gain. When $(Klb/Ksp)$ is increased as 0.5, 1, 2, 4, and 8 as shown in FIG. 10, the frequency increases and the gain decreases.

To increase (Klb/Ksp), Klb must be increased because Ksp is restricted by the resilient part 11. Namely, the vertical stiffness (rigidity) of the load beam must be improved. To increase $\omega 0^2$, M must be reduced.

In consequence, to reduce the displacement X, the vertical stiffness of the load beam must be improved and the mass M must be reduced.

Figure 11:
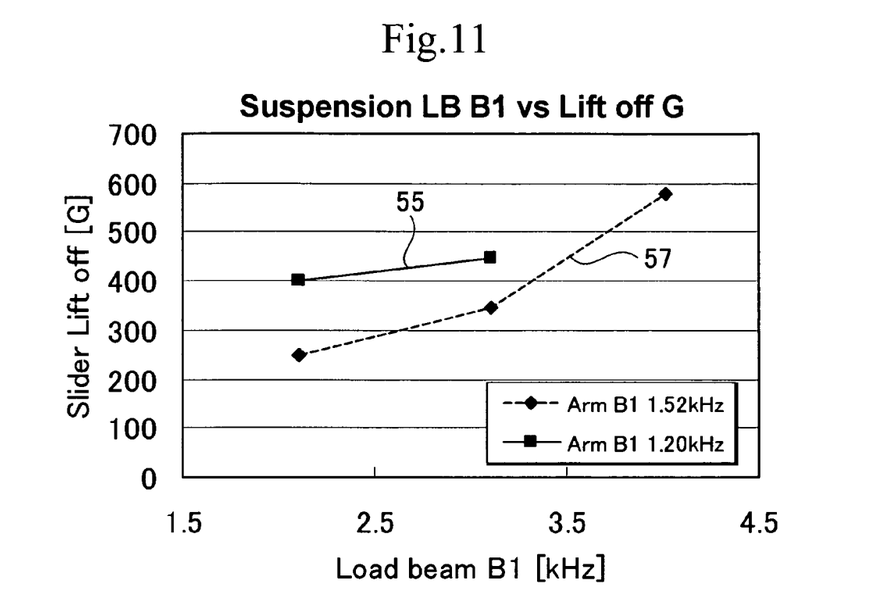
FIG. 11 is a graph showing a relationship among the B1 frequency of an arm, the B1 frequency of a load beam, and the lift-off of a slider.

FIG. 11 is a graph showing a relationship among the B1 frequency of an arm, the B1 frequency of a load beam, and the lift-off of a slider. An abscissa represents the B1 frequency of a load beam and an ordinate represents the acceleration of a shock at which a slider of the load beam lifts. A curve 55 is for an arm having a B1 frequency of 1.20 kHz and a curve 57 is for an arm having a B1 frequency of 1.52 kHz.

As is apparent in FIG. 11, a load beam having a low B1 frequency is unable to follow the arm having the high B1 frequency, demonstrates an inferior shock property, and causes the slider thereof to lift at a low acceleration. A load beam having a B1 frequency of 4 kHz can sufficiently follow the arm having the high B1 frequency of 1.52 kHz, demonstrates a superior shock property, and realizes a high acceleration level at which the slider thereof lifts.

Figure 12:
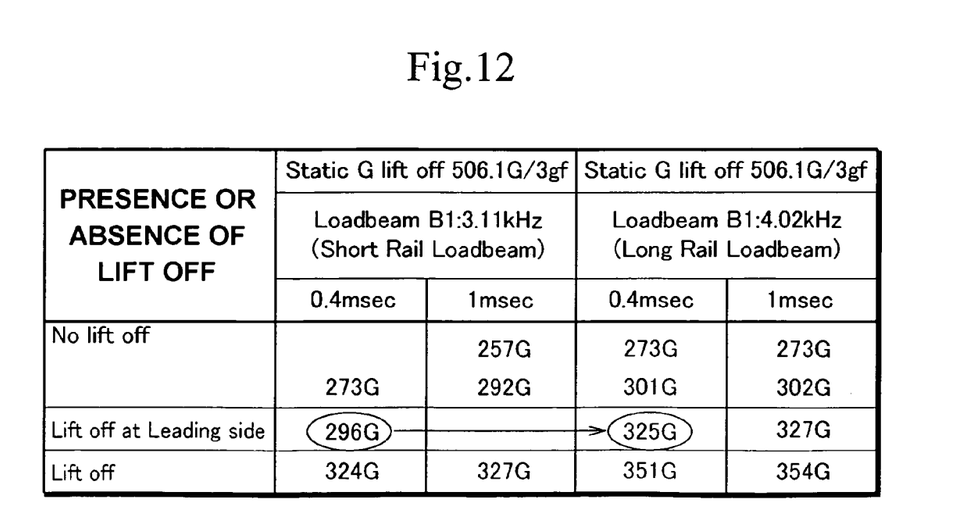
FIG. 12 is a list showing a relationship among the lift-off of a slider, the magnitude of a shock applied, and the B1 frequency of a load beam of a head suspension in a 2.5-inch disk drive.

Data shown in FIG. 11 are obtained according to only a relationship between a carriage arm and a head suspension. In practice, the behavior of a head suspension base, the operation mode of a disk, and other conditions are involved to complicate situations around the head suspension. FIG. 12 shows data sampled from head suspensions in more practical situations.

FIG. 12 is a list showing a relationship among the lift-off of a slider, the magnitude of a shock applied, and the B1 frequency of a load beam of a head suspension. The data shown in FIG. 12 relates to a 2.5-inch hard disk drive. When the B1 frequency of a load beam is increased from 3.11 kHz to 4.02 kHz as shown in FIG. 12, the level of a shock of 0.4 msec duration (short duration) at which the slider of the load beam lifts increases from 296 G to 325 G In this way, increasing the B1 frequency of a load beam is effective to suppress a lift-off of the slider of the load beam.

Figure 13:
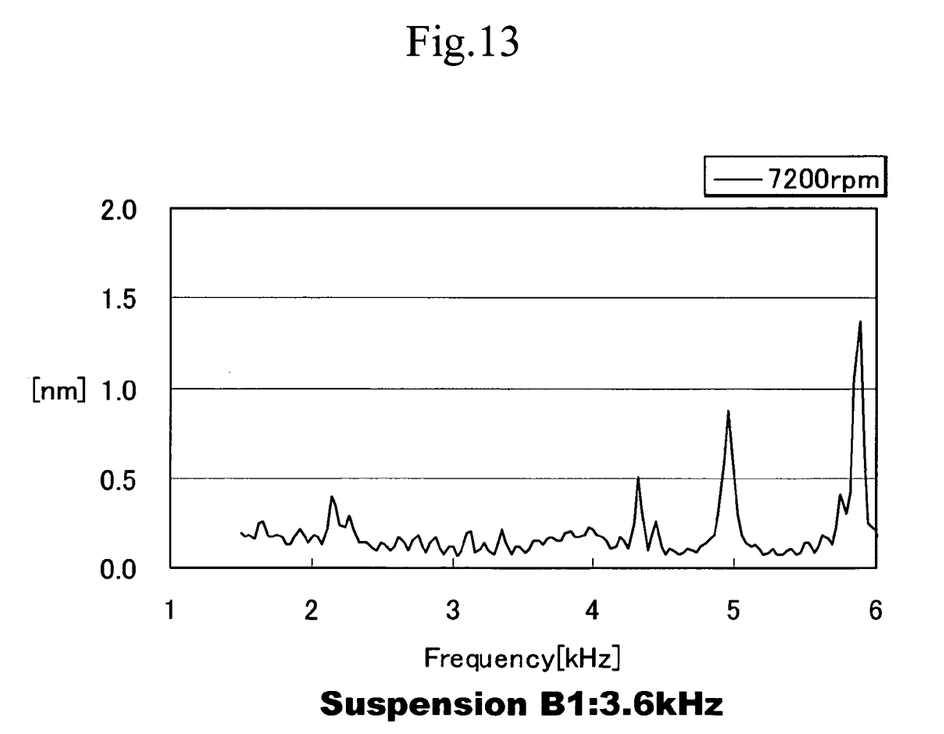
FIG. 13 is a graph showing the off-track property of a head suspension, including an arm, which has a total B1 frequency of 3.6 kHz (including an arm)

FIG. 13 is a graph showing the off-track property of a head suspension, including an arm, which has a total B1 frequency of 3.6 kHz. An abscissa represents frequencies and an ordinate represents off-track amount. The data shown in FIG. 13 relates to a 2.5-inch hard disk rotating at 7200 rpm.

As explained with reference to FIG. 19, a head suspension having a low B1 frequency overlaps the bending mode of a head suspension and the bending mode of an arm each other, to cause an off-track error.

The embodiment improves the vertical stiffness (rigidity) of the load beam 3 as shown in FIG. 4, to increase the B1 frequency of the load beam 3. This results in eliminating the overlapping of the bending modes of the head suspension 1 and arm 5 and reducing a bending amplitude. It is apparent from comparison between the embodiment of FIG. 13 and the related art of FIG. 19 that the embodiment causes no off-track error related to the bending mode of the head suspension 1.

In summary, the head suspension 1 according to the embodiment of the present invention includes the rigid part 9 provided with the rails 33. The rigid part 9 has the body 23 and the joint 25 that is connected to the first end 13 of the resilient part 11. The rails 33 each extend along a side edge of the body 23 of the rigid part 9 and rise in a thickness direction of the body 23. The first end 13 of the resilient part 11 is provided with the extensions 36 extending over the joint 25 of the rigid part 9 toward the body 23 of the rigid part 9. The extensions 36 are fixed to the body 23. This configuration improves the vertical rigidity of the load beam 3, increases the B1 frequency of the load beam 3, and satisfies a shock property required for the head suspension 1.

According to the embodiment, two extensions 36 are formed along the side edges of the rigid part 9, to surely reinforce the blanks 41 left between the both rails 33 and the joint 25 of the rigid part 9, improve the vertical rigidity of the load beam 3, increase the B1 frequency of the load beam 3, and secure a shock property required for the head suspension 1.

The resilient part 11 is welded to the joint 25 of the rigid part 9 at the two spots 37 and to the body 23 of the rigid part 9 at the two spots 39. This configuration can surely reinforce the blanks 41. Since the number of the welding spots is small, the workability of the head suspension 1 improves.

The embodiment requires no additional parts for reinforcing the blanks 41. Namely, the embodiment involves no increase in the number of parts in connection with reinforcing the blanks 41. Accordingly, the head suspension 1 according to the embodiment is easy to assemble, and the management of parts for the head suspension 1 is simple.

Each extension 36 may be further extended to increase the number of welding spots (37, 39).

The space 35 formed at the first end 13 of the resilient part 11 may be removed to integrate the extensions 36 into one.

What is claimed is:

1. A head suspension for a hard disk drive, comprising;
   a base configured to be attached to a carriage of the hard disk drive and turned around a spindle of the carriage;
   a load beam comprising:
   a rigid part having;
      a body extending in a longitudinal direction, said body having side edges opposing in a widthwise direction and extending substantially in the longitudinal direction, and rails rising from said side edges in a depthwise direction of said body and extending along said side edges, said body having a first body end proximate said base and beginning at a position defined by rail ends of said rails, and a second body end distal said base; and
      a joint portion extending from said first body end toward said base and outside of a position between said rails;
   a resilient part formed non-integral to said rigid part, said resilient part connecting said rigid part to said base, said resilient part having a base end attached to the base and a distal end portion distal said base and attached to both the joint portion and the body of the rigid part, said distal end portion being attached to the body of the rigid part at a position between said rails; and
   a head for writing and reading data to and from a disk arranged in the hard disk drive, the head being arranged at a front end of the load beam and receiving a load from he load beam; and
   a flexure attached to the load beam, supporting the head, and having read/write wires connected to the head.

2. The head suspension of claim 1, wherein said distal end portion includes extensions respectively extending from opposing sides of the base end of the resilient part so as to continue along each respective one of the side edges of the body of the rigid part.

3. The head suspension of claim 2 wherein the flexure is disposed in part between the extensions of the resilient part.

4. The head suspension of claim 2, wherein extensions are welded to the joint portion of the rigid part at least at two spots and to the body of the rigid part at least at two spots.

5. The head suspension of claim 4 wherein the flexure is disposed in part between the extensions of the resilient part.

6. The head suspension of claim 1, wherein the resilient part has the distal end portion welded to the joint portion of the rigid part at least at two spots and to the body of the rigid pan at least at two spots.

7. The head suspension of claim 6 wherein the flexure is disposed in part between the extensions of the resilient part.

* * * * *